US012386041B2

(12) United States Patent
Lu et al.

(10) Patent No.: US 12,386,041 B2
(45) Date of Patent: Aug. 12, 2025

(54) SPINNING LiDAR WITH ONE DIMENSIONAL MEMS SCANNER

(71) Applicant: BEIJING VOYAGER TECHNOLOGY CO., LTD., Beijing (CN)

(72) Inventors: Yue Lu, Mountain View, CA (US); Youmin Wang, Berkeley, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 1164 days.

(21) Appl. No.: 17/224,117

(22) Filed: Apr. 6, 2021

(65) Prior Publication Data

US 2022/0317261 A1    Oct. 6, 2022

(51) Int. Cl.
*G01S 7/481* (2006.01)
*G01S 17/89* (2020.01)
*G01S 17/931* (2020.01)

(52) U.S. Cl.
CPC .......... *G01S 7/4817* (2013.01); *G01S 7/4814* (2013.01); *G01S 17/89* (2013.01); *G01S 17/931* (2020.01)

(58) Field of Classification Search
CPC .... G01S 7/4817; G01S 7/4814; G01S 17/931; G01S 17/89; G01S 2013/93273
USPC ....................................................... 356/4.01
See application file for complete search history.

(56) References Cited

U.S. PATENT DOCUMENTS

| | | | |
|---|---|---|---|
| 2019/0317199 | A1 | 10/2019 | Chong |
| 2019/0317503 | A1 | 10/2019 | Droz et al. |
| 2020/0182975 | A1 | 6/2020 | Wang et al. |
| 2020/0200877 | A1 | 6/2020 | Yoo et al. |

FOREIGN PATENT DOCUMENTS

CN    110794382 A    2/2020

OTHER PUBLICATIONS

International Search Report issued in corresponding International Application No. PCT/CN2021/062276, mailed Mar. 31, 2022, 3 pages.
Written Opinion of the International Searching Authority issued in corresponding International Application No. PCT/CN2021/062276, mailed Mar. 31, 2022, 4 pages.

*Primary Examiner* — Daniel L Murphy
(74) *Attorney, Agent, or Firm* — BAYES PLLC

(57) ABSTRACT

Embodiments of the disclosure provide an optical sensing system for two-dimensional (2D) environmental sensing and an optical sensing method for the optical sensing system. The optical sensing system includes a rotary base and a one-dimensional (1D) optical sensing apparatus supported by the rotary base. The 1D optical sensing apparatus includes an optical source configured to emit optical signals, a 1D MEMS scanner configured to direct the optical signals towards an environment surrounding the optical sensing system, and a receiver configured to receive at least a portion of the optical signals reflected from the environment. The rotary base is configured to drive the 1D optical sensing apparatus to rotate around a first axis to scan the optical signals in a first dimension and the 1D MEMS scanner is configured to independently rotate around a second axis to scan the optical signals in a second dimension in the 2D environmental sensing.

20 Claims, 7 Drawing Sheets

SPINNING LiDAR WITH ONE DIMENSIONAL MEMS SCANNER

TECHNICAL FIELD

The disclosure relates to a light detection and ranging (LiDAR) system, and more particularly to, a spinning LiDAR system with a one-dimensional (1D) micro-electro-mechanical systems (MEMS) scanner for two-dimensional (2D) environmental sensing.

BACKGROUND

In 2D environment sensing, conventional spinning LiDAR systems spin a laser array and a detector array to scan the laser beams and construct point cloud scenes. These spinning LiDAR systems have some drawbacks. First, these spinning LiDAR systems use a large number of laser emitters and detectors to form the arrays and require element-to-element alignment between the respective emitters and detectors, which may become time and cost prohibitive. Second, the scanning resolution and the pattern of the point clouds are fixed once the LiDAR system is assembled, and thus are not adjustable according to scanning needs after the assembly.

Embodiments of the disclosure address the above problems by providing a spinning LiDAR system with a one-dimensional MEMS scanner for 2D environmental sensing.

SUMMARY

Embodiments of the disclosure provide an optical sensing system for 2D environmental sensing. The optical sensing system includes a rotary base and a 1D optical sensing apparatus supported by the rotary base. The 1D optical sensing apparatus includes an optical source configured to emit optical signals, a 1D MEMS scanner configured to direct the optical signals towards an environment surrounding the optical sensing system, and a receiver configured to receive at least a portion of the optical signals reflected from the environment. The rotary base is configured to drive the 1D optical sensing apparatus to rotate around a first axis to scan the optical signals in a first dimension and the 1D MEMS scanner is configured to independently rotate around a second axis to scan the optical signals in a second dimension in the 2D environmental sensing.

Embodiments of the disclosure further provide an optical sensing method for an optical sensing system. The optical sensing system includes a rotary base and a 1D optical sensing apparatus supported by the rotary base, where the 1D optical sensing apparatus further includes an optical source, a 1D MEMS scanner, and a receiver. The optical sensing method includes emitting, by the optical source, optical signals. The optical sensing method further includes controlling the rotary base to rotate around a first axis, where a rotating of the rotary base causes the 1D optical sensing apparatus to also rotate around the first axis, to allow the 1D MEMS scanner to direct the optical signals in a first dimension towards an environment. The optical sensing method additionally includes controlling the 1D MEMS scanner to independently rotate around a second axis, to direct the optical signals in a second dimension towards the environment. The optical sensing method additionally includes receiving, by the receiver, at least a portion of the optical signals reflected from the environment.

It is to be understood that both the foregoing general description and the following detailed description are exemplary and explanatory only and are not restrictive of the disclosure, as claimed.

DETAILED DESCRIPTION

Figure 1:
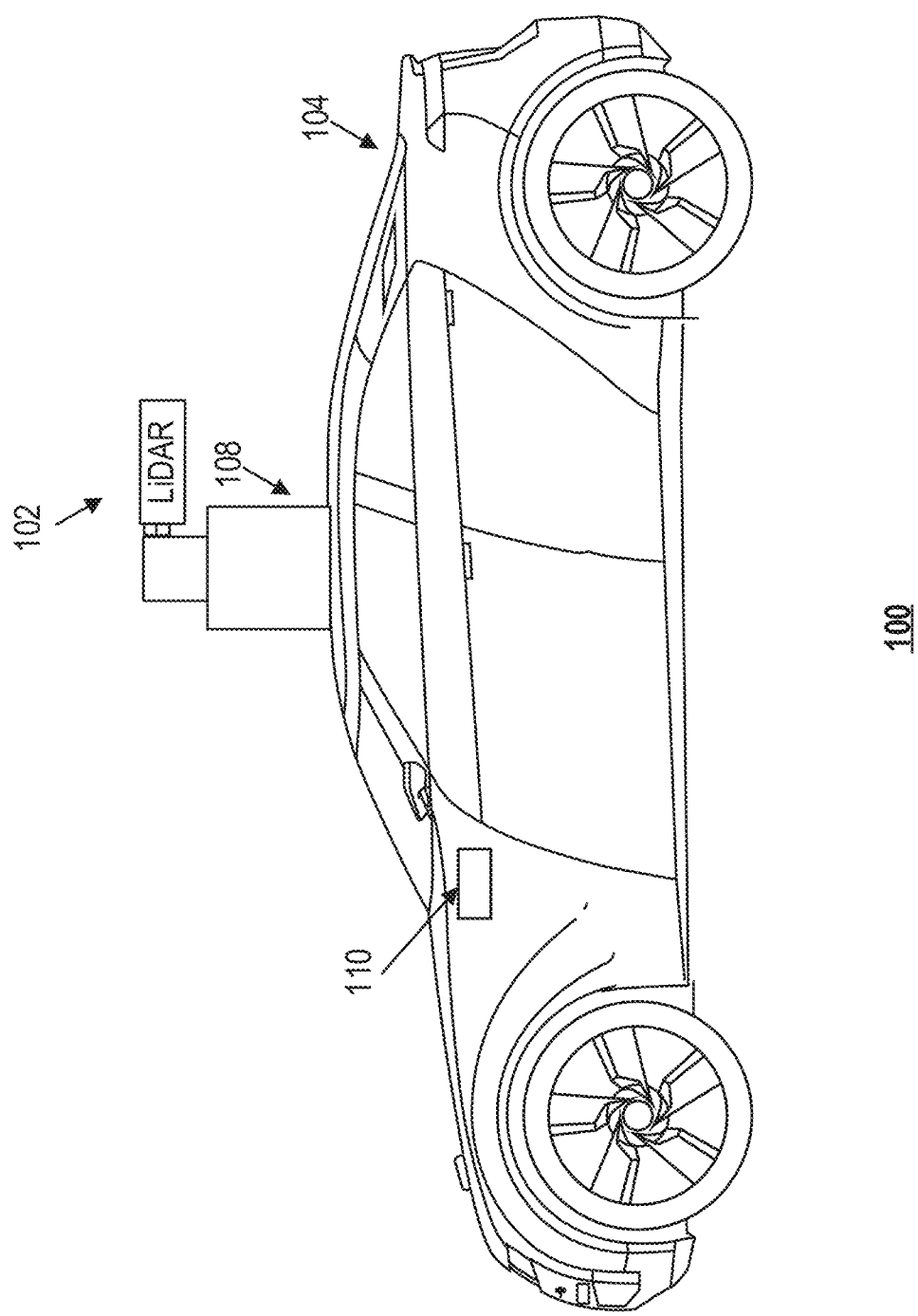
FIG. 1 illustrates a schematic diagram of an exemplary vehicle equipped with a spinning LiDAR system with a one-dimensional MEMS scanner, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the disclosure provide an exemplary spinning LiDAR system with a 1D MEMS scanner. The spinning LiDAR system may include a rotary base and a 1D optical sensing apparatus mounted on the rotary base. The rotary base may be controlled to rotate to certain degrees (e.g., ±90 degrees, 360 degrees, etc.). The 1D optical sensing apparatus may include an optical source, a 1D MEMS scanner, and a receiver. The optical source may include one or more laser emitting modules, and the receiver may include one or more photosensors. The one or more photosensors may be aligned with the respective one or more laser emitting modules.

In some embodiments, when rotating, the rotary base of the spinning LiDAR system may cause the 1D optical sensing apparatus mounted on the rotary base to rotate along its central axis. Although the optical source, 1D MEMS scanner, and receiver do not rotate by themselves, since the whole optical sensing apparatus is caused to rotate, the optical source, 1D MEMS scanner, and receiver will collectively move around the same axis circularly when the rotary base rotates. As result, the 1D MEMS scanner also moves around the same axis, thus achieving a first dimensional scanning during a scanning process. In some embodiments, the first dimensional scanning may be a horizontal scanning if the central axis of the rotary base is vertically aligned when the spinning LiDAR system is mounted on a vehicle or other device.

In some embodiments, the 1D MEMS scanner itself may be actuated by an actuation mechanism, and thus may rotate around a rotational axis of the 1D MEMS scanner during a scanning process, thereby achieving a second dimensional scanning caused by the rotation of the 1D MEMS scanner itself. In some embodiments, when the spinning LiDAR system is mounted onto the rotary base, the rotational axis of the 1D MEMS scanner may be aligned in a way perpendicular to the central axis of the rotary base. Since the first dimensional scanning achieved through the rotation of the 1D optical sensing apparatus (caused by the rotary base) and the second dimensional scanning achieved by the rotation of the 1D MEMS scanner itself are perpendicular to each other, a 2D scanning may be then achieved by the disclosed spinning LiDAR system with a 1D MEMS scanner.

In some embodiments, when the disclosed spinning LiDAR system with the 1D MEMS scanner rotates, the relative positions between the optical source (e.g., the one or more laser emitting modules) and the receiver (e.g., the one or more photosensors) do not change, and thus the alignment between the optical source and the receiver remains unchanged.

As can be seen above, with just a very limited number of optical sources and receivers (e.g., only one laser emitting module and one photosensor), 2D scanning can be conveniently achieved through the disclosed spinning LiDAR system with a 1D MEMS scanner. Therefore, the disclosed spinning LiDAR system requires much less alignment of laser emitters and photosensors than conventional spinning LiDAR systems. As such, the disclosed spinning LiDAR system is cost-effective and easier to assemble and maintain. In addition, in the disclosed spinning LiDAR system, the whole field-of-view (FoV) (e.g., up to 360 degrees of peripheral view) may be achieved with only one emitter-detector set, which simplifies the backend circuity (e.g., no requirement of dual-channel highly sensitive analog-to-digital converter and high-performance field-programmable gate array). Further, the scanning precision (e.g., in the vertical direction) can be improved by the disclosed spinning LiDAR system due to the MEMS actuated scanning process. The features and advantages described herein are not exhaustive and many additional features and advantages will be apparent to one of ordinary skill in the art in view of the figures and the following descriptions.

The disclosed spinning LiDAR system with a 1D MEMS scanner can be used in many applications. For example, the disclosed spinning LiDAR system can be used in advanced navigation technologies, such as to aid autonomous driving or to generate high-definition maps, in which the optical sensing system can be equipped on a vehicle.

FIG. 1 illustrates a schematic diagram of an exemplary vehicle equipped with a spinning LiDAR system containing a 1D MEMS scanner, according to embodiments of the disclosure. Consistent with some embodiments, vehicle 100 may be a survey vehicle configured for acquiring data for constructing a high-definition map or three-dimensional (3D) buildings and city modeling. Vehicle 100 may also be an autonomous driving vehicle.

As illustrated in FIG. 1, vehicle 100 may be equipped with an optical sensing system, e.g., a spinning LiDAR system with a 1D MEMS scanner (also referred to as "LiDAR system 102" hereinafter) mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a 1D MEMS scanner of LiDAR system 102 may be configured to scan the surrounding environment, including an up to 360-degree peripheral scanning of the surrounding environment when driven by a rotary base of LiDAR system 102. LiDAR system 102 measures distance to a target by illuminating the target with laser beams and measuring the reflected/scattered pulses with a receiver. The laser beams used for LiDAR system 102 may be ultraviolet, visible, or near-infrared, and may be pulsed or continuous wave laser beams. In some embodiments of the present disclosure, LiDAR system 102 may capture point clouds including depth information of the objects in the surrounding environment, which may be used for constructing a high-definition map or 3D buildings and city modeling. As vehicle 100 moves along the trajectory, LiDAR system 102 may continuously capture data including the depth information of the surrounding objects (such as moving vehicles, buildings, road signs, pedestrians, etc.) for map, building, or city modeling construction.

Figure 2:
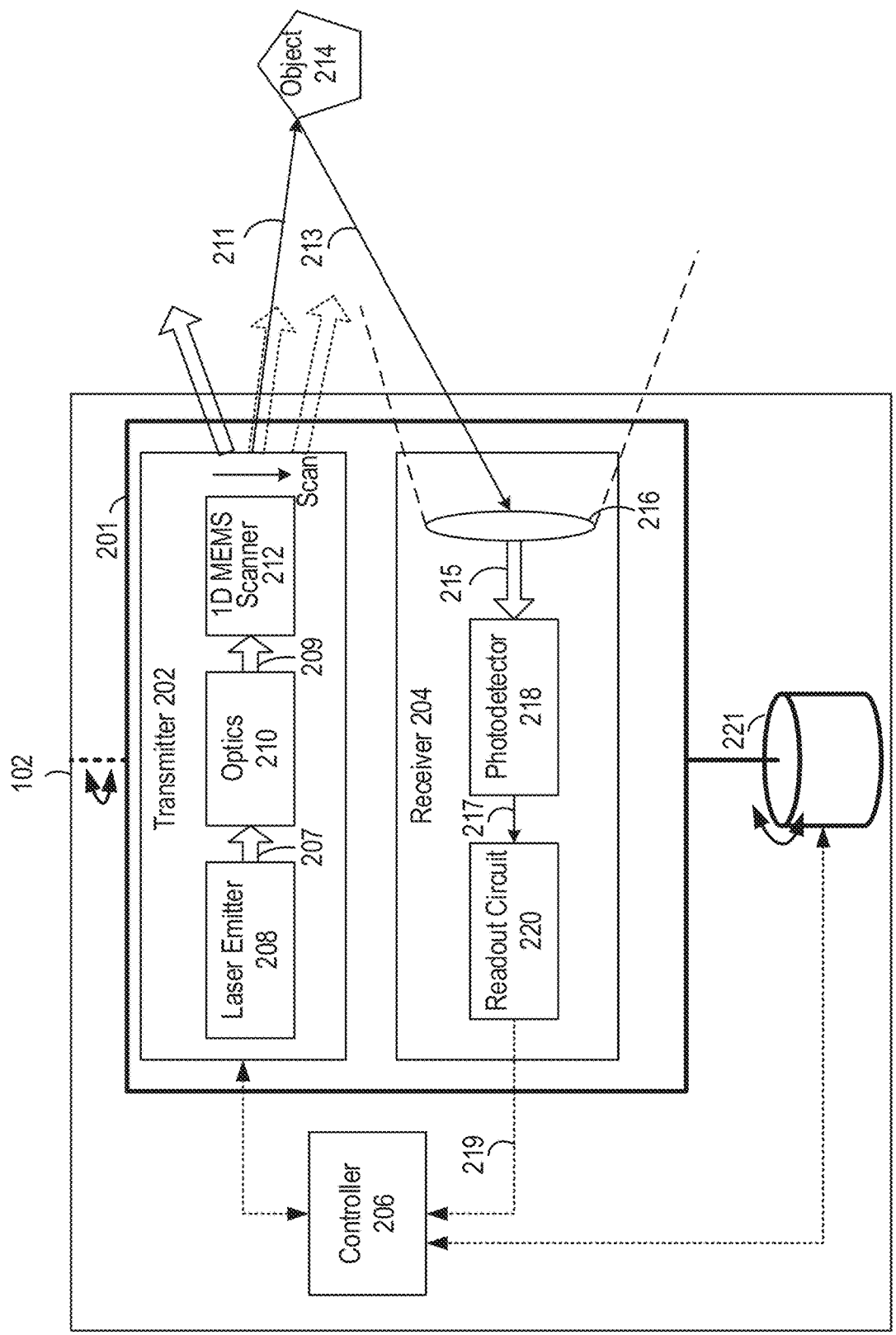
FIG. 2 illustrates a block diagram of an exemplary spinning LiDAR system with a one-dimensional MEMS scanner, according to embodiments of the disclosure.

FIG. 2 illustrates a block diagram of an exemplary spinning LiDAR system 102 containing a 1D MEMS scanner, according to embodiments of the disclosure. In some embodiments, LiDAR system 102 may be a semi-coaxial LiDAR, a coaxial LiDAR, etc. As illustrated, LiDAR system 102 may include a rotary base 221, a 1D optical sensing apparatus 201 mounted on rotary base 221, and a controller 206 coupled to 1D optical sensing apparatus 201 and/or rotary base 221. Controller 206 may communicate (e.g., data or power transmission) with 1D optical sensing apparatus 201 through wired or wireless connection. 1D optical sensing apparatus 201 may further include a transmitter 202 and a receiver 204. In some embodiments, transmitter 202 may further include a laser emitter 208 for emitting an optical signal and one or more optics 210 for collimating the optical signal. In some embodiments, transmitter 202 may additionally include a 1D MEMS scanner 212 for steering the collimated optical signal according to a certain pattern. Receiver 204 may further include a receiving lens 216, a photodetector 218, and a readout circuit 220.

Transmitter 202 may emit optical beams (e.g., pulsed laser beams, continuous wave (CW) beams, frequency modulated continuous wave (FMCW) beams) along multiple directions, e.g., up to a 360-degree peripheral field of view when rotary base 221 causes 1D optical sensing apparatus 201 to rotate in a scanning process. According to one example, transmitter 202 may sequentially emit a stream of laser beams in a vertical field-of-view (FOV) that can be up to 360 degrees in horizontal directions.

Laser emitter 208 may be configured to emit laser beams 207 (also referred to as "native laser beams") to optics 210. For instance, laser emitter 208 may generate laser beams in the ultraviolet, visible, or near-infrared wavelength range, and provide the generated laser beams to optics 210. In some embodiments of the disclosure, depending on underlying laser technology used for generating laser beams, laser emitter 208 may include one or more of a double heterostructure (DH) laser emitter, a quantum well laser emitter, a quantum cascade laser emitter, an interband cascade (ICL) laser emitter, a separate confinement heterostructure (SCH) laser emitter, a distributed Bragg reflector (DBR) laser emitter, a distributed feedback (DFB) laser emitter, a vertical-cavity surface-emitting laser (VCSEL) emitter, a vertical-external-cavity surface-emitting laser (VECSEL) emitter, an extern-cavity diode laser emitter, etc., or any combination thereof. Depending on the number of laser emitting units or modules in a package, laser emitter 208 may include a single emitter containing a single light-emitting unit, a multi-emitter unit containing multiple single emitters packaged in a single chip, an emitter array or laser diode bar containing multiple (e.g., 10, 20, 30, 40, 50, etc.) single emitters in a single substrate, an emitter stack containing multiple laser diode bars or emitter arrays vertically and/or horizontally built up in a single package, etc., or any combination thereof. Depending on the operating time, laser emitter 208 may include one or more of a pulsed laser diode (PLD), a CW laser diode, a Quasi-CW laser diode, etc., or any combination thereof. Depending on the semiconductor materials of diodes in laser emitter 208, the wavelength of incident laser beams 207 may be at different values, such as 760 nm, 785 nm, 808 nm, 848 nm, 870 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as laser emitter 208 for emitting laser beams 207 at a proper wavelength.

Optics 210 may include optical components (e.g., lenses, mirrors) that can shape the laser light and collimate the laser light into a narrow laser beam 209 to increase the scan resolution and the range to scan object(s) 214. 1D MEMS scanner 212 may include various optical elements such as prisms, mirrors, gratings, optical phased array (e.g., liquid crystal-controlled grating), or any combination thereof. Consistent with embodiments of the disclosure, 1D MEMS scanner 212 in transmitter 202 may include a MEMS actuation mechanism and a mirror driven by the MEMS actuation mechanism. In some embodiments, object(s) 214 may be made of a wide range of materials including, for example, non-metallic objects, rocks, rain, chemical compounds, aerosols, clouds, and even single molecules. In some embodiments, at each time point during a scanning process, the rotary base 221 and the MEMS actuation mechanism may cooperatively control the mirror of 1D MEMS scanner 212 to steer laser beams 211 to object(s) 214 in a 2D scanning pattern, as described in more detail in FIGS. 3-7.

Receiver 204 may be configured to detect returned laser beams 213 returned from object 214. Upon contact, laser light can be reflected/scattered by object 214 via backscattering, such as Raman scattering, and fluorescence. Returned laser beams 213 may be in a same or different direction from laser beams 211. In some embodiments, receiver 204 may collect at least a portion of laser beams returned from object 214 and output signals reflecting the intensity of the returned laser beams.

As illustrated in FIG. 2, receiver 204 may include one or more receiving lenses 216, a photodetector 218, and a readout circuit 220. Receiving lens(es) 216 may be configured to converge and focus the returning optical signal on photodetector 218 as a focused laser beam 215.

Photodetector 218 may be configured to detect the focused laser beams 215. In some embodiments, photodetector 218 may convert a laser beam 215 into an electrical signal 217 (e.g., a current or a voltage signal). Electrical signal 217 may be an analog signal which is generated when photons are absorbed in a photodiode included in photodetector 218. In some embodiments, photodetector 218 may include a PIN detector, an avalanche photodiode (APD) detector, a single photon avalanche diode (SPAD) detector, a silicon photo multiplier (SiPM) detector, or the like. In some embodiments, photodetector 218 may include a plurality of photosensors or pixels arranged in a one-dimensional, two-dimensional array, or even three-dimensional array.

Readout circuit 220 may be configured to integrate, amplify, filter, and/or multiplex signal detected by photodetector 218 and transfer the integrated, amplified, filtered, and/or multiplexed signal 219 onto an output port (e.g., controller 206) for readout. In some embodiments, readout circuit 220 may act as an interface between photodetector 218 and a signal processing unit (e.g., controller 206). Depending on the configurations, readout circuit 220 may include one or more of a transimpedance amplifier (TIA), an analog-to-digital converter (ADC), a time-to-digital converter (TDC), or the like.

Controller 206 may be configured to control transmitter 202 and/or receiver 204 to perform detection/sensing operations, and/or to control rotary base 221 to rotate according to a certain pattern. In one example, controller 206 may control laser emitter 208 to emit laser beams 207, or control 1D MEMS scanner 212 to rotate along its rotational axis to achieve a one-dimensional scanning. In another example, controller 206 may control rotary base 221 to rotate according to a certain pattern (e.g., ±90 degrees, 360 degrees, etc.).

In some embodiments, controller 206 may also control data acquisition and perform data analysis. For instance, controller 206 may collect digitalized signal information from readout circuit 220, determine the distance of object 214 from LiDAR system 102 according to the travel time of laser beams, and construct a high-definition map or 3D buildings and city modeling surrounding LiDAR system 102 based on the distance information of object(s) 214.

In some embodiments, controller 206 may be external to 1D optical sensing apparatus 201, to save the weight and space of the 1D optical sensing apparatus. That is, controller 206 may not be mounted on rotary base 221 as other components of 1D optical sensing apparatus 201. To implement respective functions, controller 206 may communicate with 1D optical sensing apparatus 201 through wired or wireless connection. For instance, if rotary base 221 is configured to rotate continuously (e.g., 360-degree rotation), a wired (e.g., through a slip ring) or wireless connection may be set up between controller 206 and 1D optical sensing apparatus 201 for data and/or power transmission. For another instance, if rotary base 221 is configured to rotate less than 360 degrees (e.g., ±90-degree rotation), a wired connection may be set up between controller 206 and 1D optical sensing apparatus 201. In some embodiments, controller 206 may also communicate with rotary base 221 through wired or wireless connection.

In some embodiments, one or more controllers 206 may be included in LiDAR system 102, each of which may implement different functions. For instance, there may be a specific controller (not shown) for controlling the rotation of rotary base 221, or there may be another different controller (not shown) for controlling the rotation of 1D MEMS scanner 212, or there may be even another different controller (not shown) to perform data analysis and map construction, etc. In some embodiments, one or more controllers 206 may be located within 1D optical sensing apparatus 201 mounted on rotary base 221. For instance, a controller for controlling the rotation of 1D MEMS scanner 212 may be included inside 1D optical sensing apparatus 201 mounted on rotary base 221. Other configurations of the one or more controllers 206, including their specific locations, for controlling the operation of the disclosed spinning LiDAR system with a 1D MEMS scanner are also possible and contemplated in the present disclosure, as further described below in FIGS. 3-7.

Figure 3:
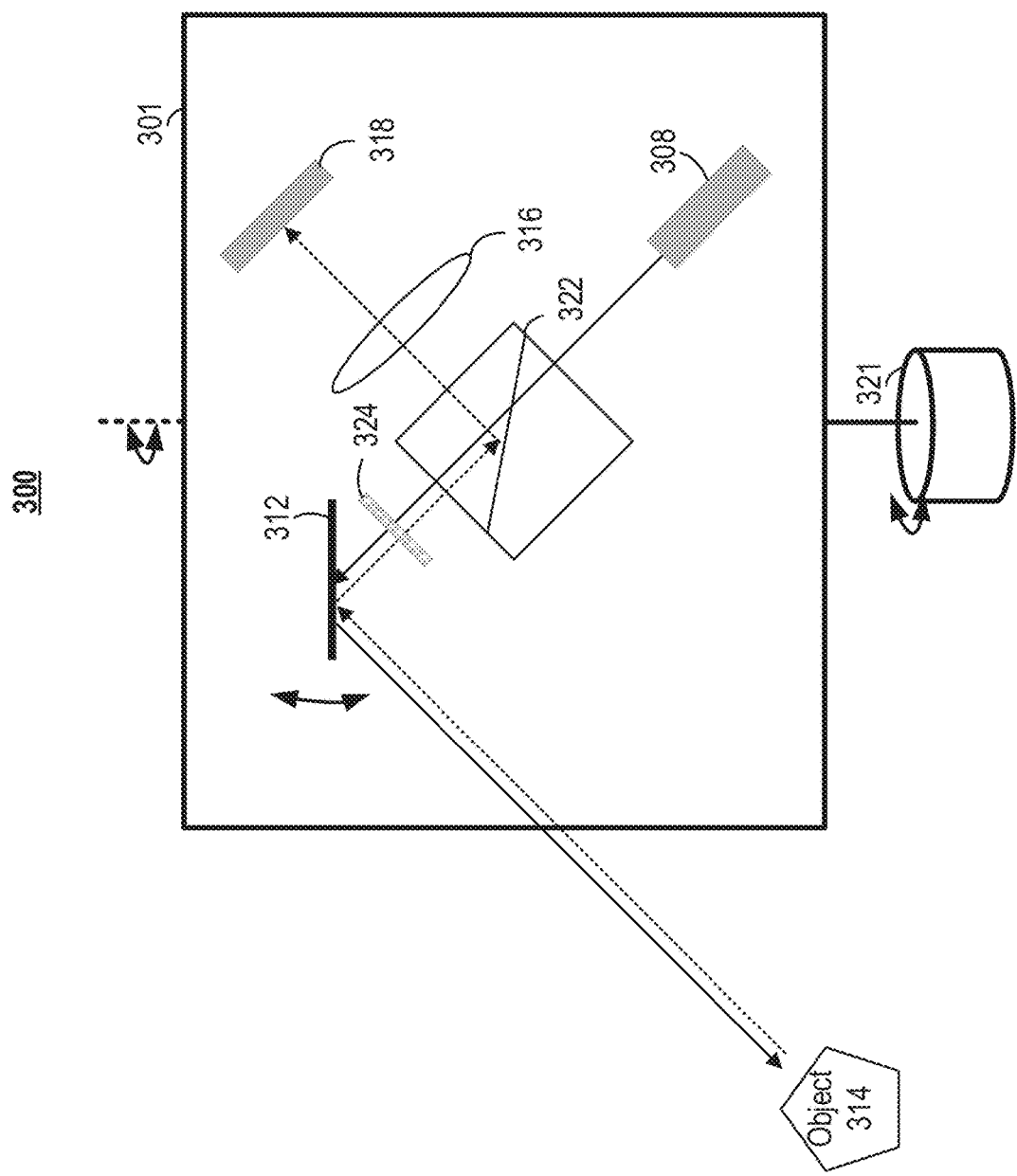
FIG. 3 illustrates a schematic diagram of an exemplary operation of a spinning LiDAR system with a one-dimensional MEMS scanner, according to embodiments of the disclosure.

FIG. 3 illustrates a schematic diagram of an exemplary operation of one spinning LiDAR system with a 1D MEMS scanner (also referred to as "LiDAR system 300" hereinafter). As illustrated, LiDAR system 300 may include a rotary base 321 and a 1D optical sensing apparatus 301 mounted on rotary base 321. 1D optical sensing apparatus 301 may further include a laser emitter 308, a 1D MEMS scanner 312, a receiving lens 316, and a photodetector 318. The components 321, 308, 312, 316, and 318 may have similar configurations and functions to those components described in FIG. 2. Although not specifically illustrated, the exemplary LiDAR system 300 may further include one or more controllers for controlling the operation and/or for achieving certain other functions of LiDAR system 300. These controllers may communicate with rotary base 321 and/or 1D optical sensing apparatus 301 through wired or wireless connection.

As illustrated in FIG. 3, in some embodiments, LiDAR system 300 may further include a beam splitter 322 configured to prevent emitted laser power from being backscattered into photodetector 318 during a sensing process. To achieve this, laser polarization may be exploited, and thus LiDAR system 300 may further include a quarter-wave plate 324. When a linearly polarized laser beam is transmitted by laser emitter 308, a polarizing beam splitter 322 may isolate it. Specifically, quarter-wave plate 324 may convert linear polarization to circular polarization. When that circular polarization bounces off of an object 314, most of the light will reverse its handedness. In return, the opposite-handedness circular-polarization beam may be converted to the opposite linear polarization of the laser and may be transmitted through the polarizing beam splitter 322 to photodetector 318. This polarization method of transmit/receive isolation can achieve up to 40-45 dB of isolation with proper design, which is proper for LiDAR applications.

Figure 4B:
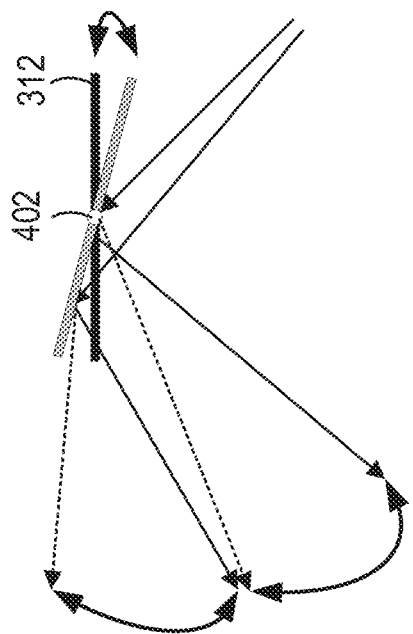
FIG. 4B illustrates a schematic diagram of an exemplary operation of a one-dimensional MEMS scanner with multiple laser emitting modules, according to embodiments of the disclosure.
Figure 4A:
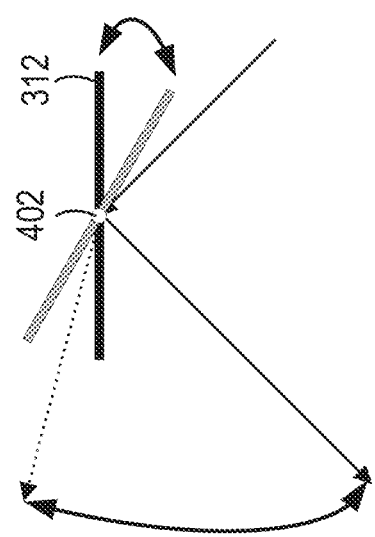
FIG. 4A illustrates a schematic diagram of an exemplary operation of a one-dimensional MEMS scanner with one laser emitting module, according to embodiments of the disclosure.

As described in FIG. 2, 1D MEMS scanner 312 may be a one-dimensional scanner. That is, 1D MEMS scanner 312 may be controlled to rotate along one axis (e.g., a horizontal axis). For instance, as illustrated in FIG. 4A, 1D MEMS scanner 312 may be controlled to rotate along a rotational axis 402 of the 1D MEMS scanner. The rotational axis of the 1D MEMS scanner may be an axis perpendicular to a central axis of rotary base 321, when 1D optical sensing apparatus 301 is mounted onto rotary base 321. For instance, if the central axis of rotary base 321 is vertical when mounted onto a vehicle 100, the rotational axis 402 of 1D MEMS scanner 312 may be then a horizontal axis. On the other hand, if the central axis of rotary base 321 is horizontal when mounted on a vehicle 100, the rotational axis 402 of 1D MEMS scanner 312 may be then a vertical axis.

As also illustrated in FIG. 4A, when 1D MEMS scanner 312 is controlled to rotate to certain angles, the reflected laser beams may be directed towards the environment in different directions. Accordingly, when 1D MEMS scanner 312 is controlled to rotate within a certain angle range along rotational axis 402, the reflected laser beams may be directed to certain coverage in the environment in one dimension. For instance, if 1D MEMS scanner 312 is controlled to rotate within 30 degrees along a horizontal rotational axis 402, the reflected laser beams may have a 60-degree coverage in the environment in the vertical dimension, as shown in FIG. 4A.

In some embodiments, there may be multiple laser emitting modules in LiDAR system 300. To achieve a same coverage as shown in FIG. 4A (in which there is only one laser emitting module), 1D MEMS scanner 312 may be controlled to rotate within a smaller angle range. For instance, if there are two laser emitting modules, to cover a vertical dimension of 60-degree coverage in the environment, 1D MEMS scanner 312 may be controlled to rotate within a 15-degree angle range (which is half than that is in FIG. 4A), since each laser emitting module is just responsible for covering half of the area, as shown in FIG. 4B. Similarly, if there are three laser emitting modules in laser emitter 308, a 10-degree angle range may achieve the same as shown in FIG. 4A. That is, the more laser emitting modules in LiDAR system 300, the smaller angle range the 1D MEMS scanner 312 may need to rotate, to cover a same area in the environment.

As previously described, one obvious advantage of the disclosed LiDAR system is that a very limited number of transmitters/receivers are used in such a LiDAR system to achieve 2D environmental sensing. In its simplest form, only one laser emitting module and one photosensor are used to achieve a target 2D environment sensing. In another form, only very few laser emitting modules (e.g., less than a first threshold, which may be 2, 4, 6, 8, etc.) and very few photosensors (e.g., less than a second threshold, which may be also 2, 4, 6, 8, etc.) are used to achieve a 2D scanning. Since the number of laser emitting modules and photosensors used in the disclosed spinning LiDAR system is very limited and much smaller than other existing spinning LiDAR systems, the alignment between the laser emitting module(s) and photosensor(s) is much easier to achieve, as previously described. In some embodiments, a monolithic emitter array and a monolithic detector array may be applied to a LiDAR system that contains a number of emitters and detectors, which may further simplify an alignment process and lower the cost.

Referring back to FIG. 3, in some embodiments, different drive forces may be applied to control the rotation of 1D MEMS scanner 312 along the rotational axis 402 of the 1D MEMS scanner. These drive forces may be generated by different electromagnetic, electrostatic, thermo-electric, and piezo-electric effects, etc. According to one example, magnetic actuators may be used here due to their good linearity of the tilt angle versus the applied signal amplitude in static and dynamic operations. To drive the mirror in the 1D MEMS scanner to tilt, a metallic coil may be placed on the 1D MEMS scanner or mirror itself. As the mirror is placed in a magnetic field, the alternating current flowing in the coil may generate Lorentz force that tilts the mirror. A magnetically actuated mirror requires a low voltage (e.g., below 5V), making this actuation compatible with standard complementary metal-oxide-semiconductor (CMOS) voltage. Another advantage of such actuation type is that MEMS behavior does not present hysteresis, as opposed to electrostatic actuated MEMS mirrors, which makes it very simple to control. Apparently, under proper configurations, certain electrostatically, thermo-electrically, or piezo-electrically actuated scanners may be also used in place of 1D MEMS scanner 312 to achieve a one-dimensional (e.g., vertical dimension) scanning by the rotation of the 1D MEMS scanner.

In some embodiments, to achieve a 2D scanning for LiDAR system 300, rotary base 321 may be controlled to rotate according to a certain pattern (e.g., rotate horizontally along a vertical axis). As previously described, the rotation of rotary base 321 may cause 1D optical sensing apparatus 301 to rotate synchronously (e.g., at a same rotational speed) with it during a scanning process. This then causes the 1D MEMS scanner 312 to circularly move around a same axis of rotary base 321. As previously described, the central axis of rotary base 321 may be perpendicular to the rotational axis of 1D MEMS scanner 312 when 1D MEMS scanner 312 is mounted with other components of 1D optical sensing apparatus 301 onto rotary base 321. Accordingly, during a scanning process, LiDAR system 300 may achieve a 2D scanning, with scanning in the one dimension realized by the rotation of 1D MEMS scanner 312 itself, and scanning in the other dimension realized by the circular movement of 1D MEMS scanner 312 around the central axis of rotary base 321.

In some embodiments, depending on the maximum rotation angles configured for rotary base 321, LiDAR system 300 may be controlled to cover a certain angle range during a scanning process. For instance, a controller may control rotary base 321 to horizontally rotate ±30, ±45, ±60, ±75, ±90, ±105 degrees, and so on. In this way, LiDAR system 300 may be then controlled to cover a partial coverage around a vehicle on which LiDAR system 300 is mounted. For instance, if LiDAR system 300 is mounted on the front (e.g., along with a front plate of a vehicle) of the vehicle, a ±90-degree rotation of rotary base 321 may allow LiDAR system 300 to cover a front half FOV in front of the vehicle. For another instance, if LiDAR system 300 is mounted along with a front left lamp, a ±45-degree rotation of rotary base 321 may allow LiDAR system 300 to have a quarter coverage on the front-left of the vehicle. Other instances of rotation configuration for rotary base 321 and respective coverages are also possible and contemplated in the disclosure.

In some embodiments, a controller may control rotary base 321 to continuously rotate 360-degrees in one direction without back and forth (also referred to as "spin"). In this way, LiDAR system 300 may achieve coverage that covers all horizontal directions around a vehicle. For instance, for a LiDAR system 300 that is mounted on top of a vehicle 100, rotary base 321 may be controlled to rotate continuously (clockwise or anti-clockwise) during a scanning process, to achieve a 360-degree horizontal FOV around the vehicle.

In some embodiments, different connection methods may be applied for a specific LiDAR system 300, depending on the rotation configuration of the respective rotary base. For instance, if rotary base 321 of LiDAR system 300 is configured to rotate less than 360 degrees (e.g., ±45, ±90 degrees), wired data and/or power transmission to/from 1D optical sensing apparatus 301 may be configured for such a LiDAR system (e.g., a LiDAR system for mounting in front of a vehicle or on one side of a vehicle). In one example, slip rings may be used to establish physical connections between components in the rotatable 1D optical sensing apparatus 301 and other components (e.g., controller(s) and power suppl(ies)) of LiDAR system 300 external to the rotatable 1D optical sensing apparatus. This can be properly achieved if rotary base 321 and 1D optical sensing apparatus 301 do not continuously rotate (i.e., less than a full circle), as that leaves space for a wired connection to be established between components in 1D optical sensing apparatus 301 and other components in LiDAR system 300.

On the other hand, if rotary base 321 of LiDAR system 300 is configured to continuously rotate (e.g., 360-degree rotation), wireless data and/or power transmission to/from the rotatable 1D optical sensing apparatus 301 may be implemented for such a LiDAR system (e.g., a LiDAR system for mounting on top of a vehicle). In some embodiments, the slip ring-based data and/or power transmission is also possible and thus contemplated in the disclosure, although such wired transmission has drawbacks of wear and tear and thus less reliable lifetime. In some embodiments, different mechanisms may be applied to set up the wireless transmission to/from the continuously rotating 1D optical sensing apparatus 301. For instance, electrical or magnetic signals may be applied to establish a wireless connection through electromagnetic coupling. In some embodiments, due to the low transmission speed as well as signal interference problems in electromagnetic coupling, optical signals may be applied instead, to establish a wireless connection, as further described below in FIG. 5.

Figure 5:
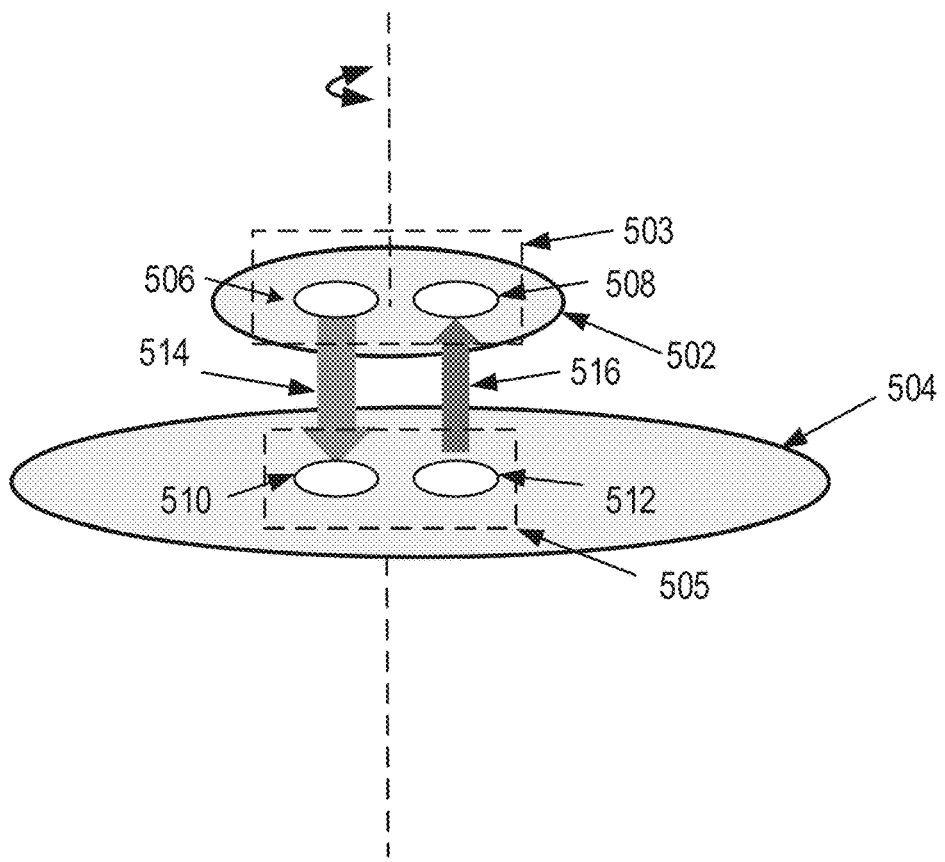
FIG. 5 illustrates a schematic diagram of an exemplary wireless connection mechanism between a first part and a second part of a spinning LiDAR system, according to embodiments of the disclosure.

FIG. 5 illustrates a schematic diagram of an exemplary wireless connection mechanism between a first part and a second part of a spinning LiDAR system 300, according to embodiments of the disclosure. According to one embodiment, the first part 502 (represented by a circle) may correspond to 1D optical sensing apparatus 301, and may include an optical transceiver 503 that includes at least one light emitter 506 and at least one detector 508. The second part 504 (represented by a circle) may correspond to other components in LiDAR system 300 except 1D optical sensing apparatus 301. Similar to the first part 502, the second part 504 may also include an optical transceiver 505 that includes at least one light emitter 512 and at least one detector 510.

Optical transceivers 503 and 505 may be configured to be wirelessly coupled to each other and simultaneously transmit signals to each other. For example, optical transceivers 503 and 505 may transmit optical signals to each other using the light emitter-detector pairs, thus establishing a wireless connection. The wireless connection between parts 502 and 504 avoids the physical contact commonly found in conventional LiDAR sensing devices using slip rings as the means to establish a connection between moving and stationary parts. Because no physical abrasion is involved, the lifespan of a spinning LiDAR system can be improved.

Optical transceivers 503 and 505 may be configured to simultaneously transmit signals to each other using non-interfering light signals to achieve full-duplex signal/data communication. For example, light emitters 506 and 512 may emit non-interfering light signals based on different wavelengths to transmit information between parts 502 and 504. For instance, light emitter 506 may be configured to emit a first light signal 514 at a first wavelength, such as a wavelength in the ultraviolet range for transmitting signals to detector 510 of part 504. Light emitter 512 may be configured to emit a second light signal 516 at a second wavelength, such as a wavelength in the visible light range or infrared range for transmitting signals to detector 508 of part 502. It is understood that other non-interfering wavelength ranges may also be used, as long as the base bands of light signals 514 and 516 are significantly non-overlapping.

For example, different colors in the visible light range may be used (e.g., red and blue, red and green, etc.) in the present disclosure.

Detectors 508 and 510 may be configured to detect light signals within differing target wavelength ranges. For example, detector 508 may be configured to react to or be sensitive to the wavelengths of the light signals emitted by light emitter 512, but insensitive to the wavelengths of the light signals emitted by light emitter 506. Similarly, detector 510 may be configured to react to or be sensitive to the wavelengths of the light signals emitted by light emitter 506, but insensitive to the wavelengths of the light signals emitted by light emitter 512. In this way, emission and detection of light signals in both directions (from part 502 to part 504 and from part 504 to part 502) can be simultaneously performed, thereby improving transmission efficiency.

In some embodiments, information related to the sensing signal may be embedded or encoded in the beam of light signal 514 using signal processing technologies (e.g., using Orthogonal Frequency Division Multiplexing or other modulation techniques to modulate the frequency, phase, and/or magnitude of the light wave emitted by light emitter 506) and may be transmitted to detector 510. Detector 510 may convert the light signals into a data stream by first converting the light signals into electrical signals and then demodulating the electrical signals into a digital data stream. Control information may be transmitted in a similar manner by light signal 516 from part 504 to part 502. It is to be noted that the signal transmission between parts 502 and 504 can be in analog or digital form, and may or may not involve signal modulation.

In some embodiments, parts 502 and 504 may also use light signals 514 and/or 516 for wireless power transfer. For example, light emitters 506 and/or 512 may convert electrical power into optical power for the transmission of energy. Detectors 508 and/or 510 may convert the optical power back to electrical power, such as DC or AC electric current which may drive electrical loads.

Accordingly, by using the wireless connection mechanism illustrated in FIG. 5, data and/or power transmission can be effectively set up between components in 1D optical sensing apparatus 301 and other components in LiDAR system 300 when rotary base 321 is configured to continuously rotate. This may then allow 1D optical sensing apparatus 301 to continuously rotate without interfering with the data and/or power transmission to/from a continuously rotating 1D optical sensing apparatus 301.

Referring back to FIG. 3, during a scanning process, different rotation speeds may be configured for rotary base 321 and/or 1D MEMS scanner 312. In one implementation, rotary base 321 may be configured to rotate slower while 1D MEMS scanner 312 is configured to rotate faster. In such implementation, LiDAR system 300 may be controlled to vertically scan the surrounding areas (e.g., up and down), where vertically scanning laser beams continue clockwise or anticlockwise. In another implementation, rotary base 321 may be configured to rotate faster (e.g., along its central axis) while 1D MEMS scanner 312 is configured to rotate slower (e.g., along its rotational axis). Accordingly, during a scanning process, LiDAR system 300 may scan the surrounding areas in a horizontal circle (if rotary base 321 rotates continuously) or arc (if rotary base 321 rotates less than 360 degrees) by gradually moving horizontal circles or arcs up or down, thereby forming a spiral pattern or partial (e.g., a quarter) of a spiral pattern. Accordingly, by controlling the respective rotation speeds of rotary base 321 and/or 1D MEMS scanner 312, different scanning patterns may be achieved by LiDAR system 300.

In some embodiments, by controlling the rotation speed of rotary base 321, the resolution for the 2D environmental sensing may be further controlled. For instance, to achieve a high resolution, the rotation speed of rotary base 321 may be controlled to be slow. On the other hand, if the resolution is not so important, but rather the time for scanning the environment is more important, the rotation speed of rotary base 321 may be controlled to be fast. Accordingly, in some embodiments, LiDAR system 300 may further include a controller (which may be similar to one of the controllers previously described) configured to control a rotation speed of the rotary base according to a target resolution for the 2D environmental sensing. In some embodiments, other approaches for controlling the resolution of the 2D environmental sensing are also possible. For instance, the firing time of the laser emitter(s) of a LiDAR system 300 may be controlled alternatively or additionally, to adjust the resolution of the 2D environmental sensing. It is to be noted that when controlling the different scanning patterns, the relative rotation speeds between rotary base 321 and 1D MEMS scanner 312 are more important. When controlling the target resolution for the 2D environmental sensing, the absolute rotation speed of rotary base 321 becomes more important. Accordingly, the terms "slow" and "fast" in the above descriptions may correspond to different speeds under different circumstances.

Figure 6:
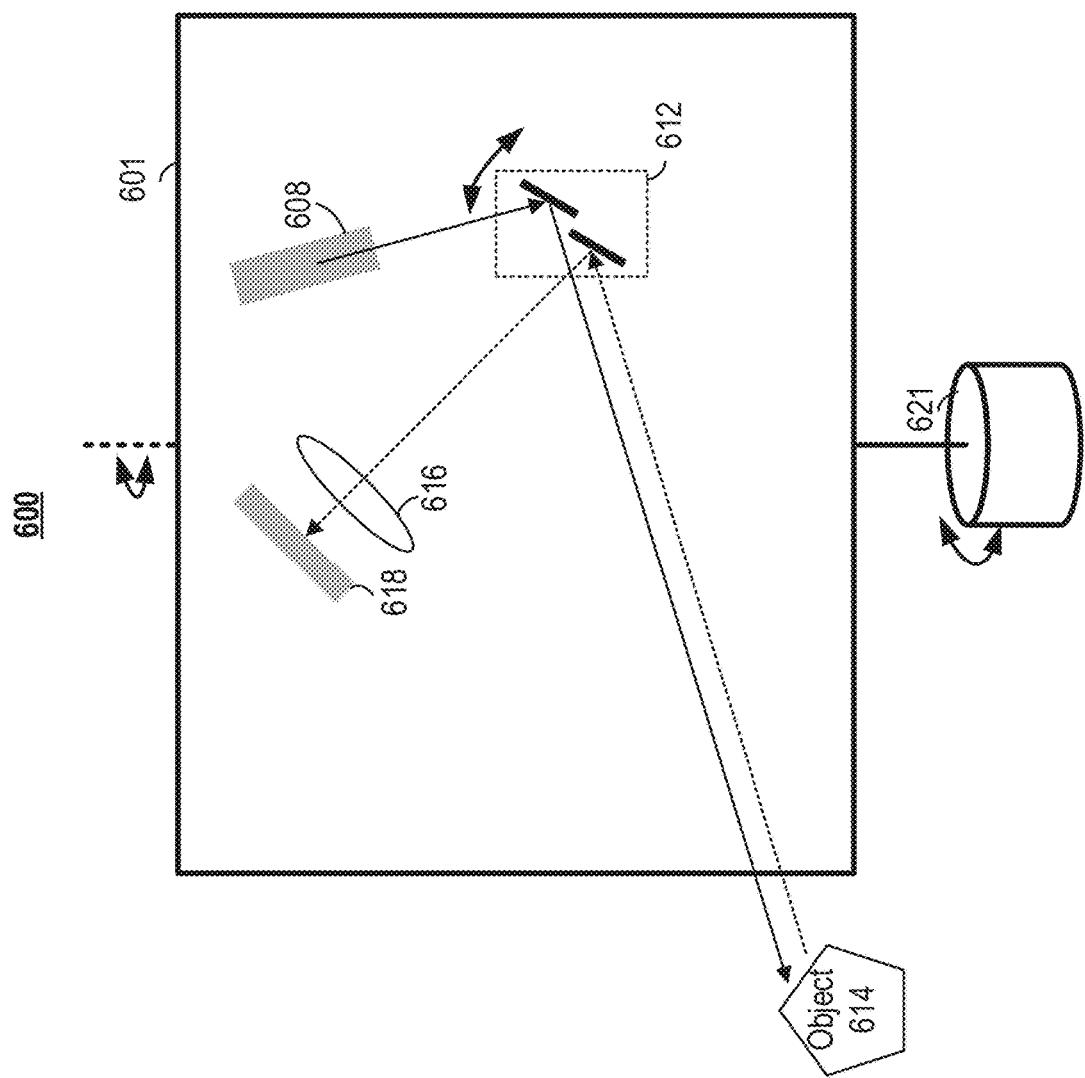
FIG. 6 illustrates a schematic diagram of an exemplary operation of another spinning LiDAR system with a one-dimensional MEMS scanner, according to embodiments of the disclosure.

FIG. 3 merely illustrates one exemplary spinning LiDAR system containing a 1D MEMS scanner. In FIG. 6, another exemplary spinning LiDAR system 600 with a 1D MEMS scanner is further provided. As illustrated, LiDAR system 600 may include a rotary base 621 and a 1D optical sensing apparatus 601. 1D optical sensing apparatus 601 may further include a laser emitter 608, a receiving lens 616, a photodetector 618, and a MEMS mirror 612, which may be a 1D MEMS array or a monolithic mirror as long as the aperture is large enough. In some embodiments, the 1D MEMS array may include a number of 1D MEMS elements organized in an array. It is to be noted that, while only one laser emitter 608 and one photodetector 618 are illustrated in spinning LiDAR system 600, it is contemplated, as described above, they can each be replaced by a small array of emitters and photodetectors. It is also to be noted that, the use of a laser array or detector array does not require the use of a 1D MEMS array. For instance, a monolithic MEMS mirror may also be paired with the laser and detector arrays in LiDAR system 600.

Different from LiDAR system 300 in which a beam splitter is used to separate returning laser beams from transmitting laser beams, in LiDAR system 600, MEMS mirror 612 is used for separating transmitting laser beams from returning laser beams. For instance, one portion of MEMS 612 may be used for laser transmitter(s) while the remaining portion of MEMS 612 may be used for photosensor(s), so as to separate light paths for transmitting laser beams and returning laser beams. In some embodiments, MEMS mirror 612 may be mounted on a rotating module for 1D rotation (e.g., rotation along a horizontal axis). Accordingly, during a scanning process, MEMS mirror 612 may be controlled to rotate to achieve one dimensional scanning, while rotary base 621 may be controlled to rotate 1D optical sensing apparatus 601 including the MEMS mirror 612 to achieve the other dimensional scanning in a 2D scanning process. In addition, by controlling the rotation speeds of MEMS mirror 612 and rotary base 621, different scanning patterns may be also achieved. Further, by controlling the rotation speed of rotary base 621 and/or firing time of the laser emitter(s) of LiDAR system 600, the resolution of the 2D environmental sensing may be also controlled, as discussed in FIG. 3.

It is to be noted that spinning LiDAR systems illustrated in FIGS. 3 and 6 are merely two exemplary spinning LiDAR systems that combine a rotary base with a 1D MEMS scanner to achieve a 2D scanning. In actual applications, many different spinning LiDAR systems that contain a 1D MEMS scanner may be applied to achieve a target 2D scan of the environment in optical sensing.

Figure 7:
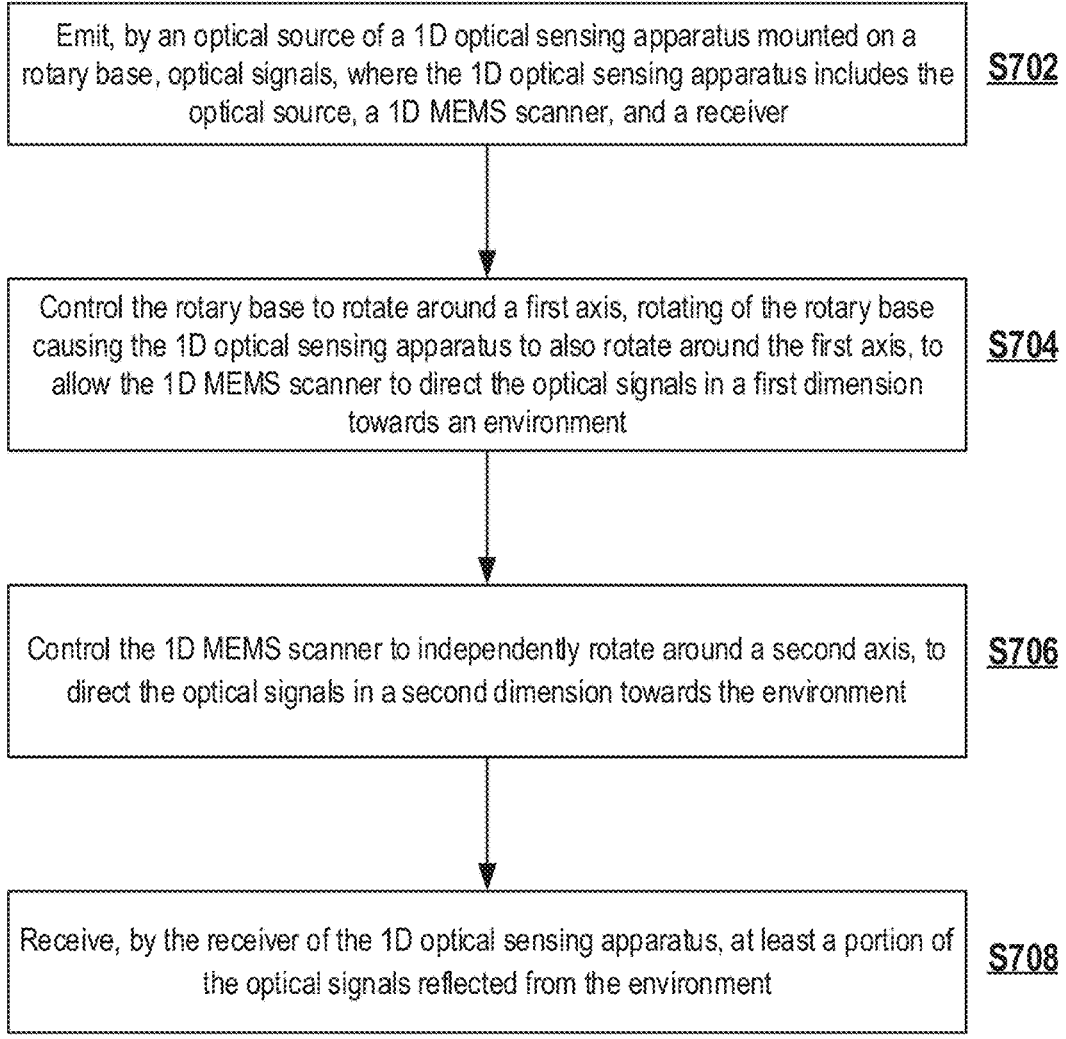
FIG. 7 is a flow chart of an exemplary optical sensing method of a spinning LiDAR system with a one-dimensional MEMS scanner, according to embodiments of the disclosure.

FIG. 7 is a flow chart of an exemplary optical sensing method of an optical sensing system (e.g., a spinning LiDAR system 102 containing a 1D MEMS scanner), according to embodiments of the disclosure. In some embodiments, method 700 may be performed by various components of LiDAR system 102, e.g., rotary base 221, 1D optical sensing apparatus 201 mounted on rotary base 221, and controller(s) 106. In some embodiments, method 700 may include steps S702-S708. It is to be appreciated that some of the steps may be optional. Further, some of the steps may be performed simultaneously, or in a different order than that shown in FIG. 7.

In step S702, an optical source (e.g., laser emitter 208 inside 1D optical sensing apparatus 201 mounted on rotary base 221) may sequentially emit a series of optical signals. Here, the series of optical signals may be emitted by the optical source at a predefined time interval. In addition, the series of signals may have a same wavelength and have a same power during a certain period when the optical sensing system is sensing an environment surrounding the system.

In some embodiments, besides the optical source that emits the optical signals, the 1D optical sensing apparatus mounted on the rotary base may further include a 1D MEMS scanner (e.g., 1D MEMS scanner 212 of LiDAR system 102) for scanning the optical signals towards the environment, and a receiver (e.g., receiver 204 of LiDAR system 102) for receiving at least a portion of the optical signals reflected from the environment surrounding the LiDAR system.

In step S704, the rotary base of the optical sensing system may be controlled to rotate around a first axis, where the first axis may be a central axis of the rotary base. When the rotary base is mounted horizontally on a vehicle (e.g., vehicle 100), and the 1D optical sensing apparatus is mounted vertically on top of the rotary base, the first axis may be a vertical axis. In some embodiments, the rotation of the rotary base may also cause the 1D optical sensing apparatus to rotate along a same axis (e.g., a same vertical axis or central axis of the rotary base). Since the 1D optical sensing apparatus is caused to rotate around the central axis, the 1D MEMS scanner is also caused to move circularly around the same central axis of the rotary base, thereby achieving a first dimension of scanning due to the circular movement of the 1D MEMS scanner. The first dimension may be a horizontal dimension if the central axis of the rotary base is vertically aligned when the optical sensing system is mounted on the vehicle.

In step S706, the 1D MEMS scanner may be controlled to independently rotate around a second axis. The independent rotation of the 1D MEMS scanner may cause the 1D scanner to further direct the optical signals towards the environment in a second dimension. In some embodiments, the second axis of the 1D MEMS scanner may be the rotational axis of the 1D MEMS scanner, and may be perpendicular to the central axis of the rotary base. Accordingly, the second dimension may be perpendicular to the first dimension. For instance, if the first dimension is a horizontal dimension, the second dimension is then a vertical dimension. Accordingly, the 1D MEMS scanner may achieve a 2D scanning of the environment, driven by its own rotation along the rotational axis and by its circular movement around the central axis of the rotary base, which is perpendicular to the rotational axis of the 1D MEMS scanner.

In step S708, the receiver of the optical sensing system may receive at least a portion of the optical signals reflected from the environment. The received portion of optical signals may follow a same path (e.g., in a coaxial LiDAR) or a different path (e.g., in a semi-coaxial LiDAR). When following a same path, a beam splitter may be disposed along the optical path, to transmit the reflected optical signals towards the receiver. In some embodiments, a quarter-wave plate may be also disposed along the optical path, to convert linear polarization to circular polarization for the beam splitter to transmit the reflected optical signals as expected. When following a different path, a reflecting mirror may reflect the returning laser beams towards the receiver. After receiving the returned portion of optical signals, the receiver may convert the received portion of optical signals to digital signals, which may be used for further analysis, e.g., for constructing a high-definition map or 3D buildings and city modeling. Depending on the rotation angles configured for the rotary base of the optical sensing system, the constructed high-definition map or 3D buildings and city modeling may cover a specific part of the areas around the vehicle, or cover more complete areas surrounding the vehicle.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. An optical sensing system for two-dimensional (2D) environmental sensing, comprising:
   a rotary base; and
   a one-dimensional (1D) optical sensing apparatus supported by the rotary base, wherein the 1D optical sensing apparatus comprises:
   an optical source, configured to emit optical signals;
   a quarter-wave plate, configured to convert a linearly polarized laser beam in the optical signal to circularly polarized or a circularly polarized laser beam in the optical signals to linearly polarized;
   a 1D micro-electro-mechanical systems (MEMS) scanner, configured to direct the optical signals towards an environment surrounding the optical sensing system; and
   a receiver, configured to receive at least a portion of the optical signals reflected from the environment,
   wherein the rotary base is configured to drive the 1D optical sensing apparatus to rotate around a first axis to scan the optical signals in a first dimension in the 2D environmental sensing and the 1D MEMS scanner is configured to independently rotate around a second axis to scan the optical signals in a second dimension in the 2D environmental sensing.

2. The optical sensing system of claim 1, wherein the first axis is a central axis of the rotary base.

3. The optical sensing system of claim 1, wherein the first dimension is perpendicular to the second dimension.

4. The optical sensing system of claim 1, wherein the optical source, the 1D MEMS scanner, and the receiver inside the 1D optical sensing apparatus synchronously move circularly around the first axis when driven by the rotary base.

5. The optical sensing system of claim 1, wherein an alignment between the optical source and the receiver remains unchanged when the 1D optical sensing apparatus is caused to rotate.

6. The optical sensing system of claim 1, wherein the 1D MEMS scanner comprises an array of MEMS mirrors each driven by a MEMS actuator coupled thereto to rotate around the second axis.

7. The optical sensing system of claim 1, wherein the 1D optical sensing apparatus further comprises a beam splitter that is configured to allow the emitted optical signals to pass through the beam splitter while transmitting the at least a portion of the optical signals towards the receiver.

8. The optical sensing system of claim 1, wherein the optical source comprises a single laser emitting module.

9. The optical sensing system of claim 1, wherein the optical source comprises a limited number of laser emitting modules less than a first predetermined threshold.

10. The optical sensing system of claim 1, wherein the receiver comprises a single photosensing detector.

11. The optical sensing system of claim 1, wherein the receiver comprises a number of photosensing detectors less than a second predetermined threshold.

12. The optical sensing system of claim 1, further comprising a controller configured to control a rotation speed of the rotary base according to a target resolution for the 2D environmental sensing.

13. An optical sensing method for an optical sensing system, the optical sensing system comprising a rotary base and a 1D optical sensing apparatus supported by the rotary base, the 1D optical sensing apparatus further comprising an optical source, a quarter-wave plate, a 1D MEMS scanner, and a receiver, the method comprising:
    emitting, by the optical source, optical signals;
    converting, by the quarter-wave plate, a linearly polarized laser beam in the optical signal to circularly polarized or a circularly polarized laser beam in the optical signals to linearly polarized;
    controlling the rotary base to rotate around a first axis, a rotating of the rotary base causing the 1D optical sensing apparatus to also rotate around the first axis, allow the 1D MEMS scanner to direct the optical signals in a first dimension towards an environment;
    controlling the 1D MEMS scanner to independently rotate around a second axis, to direct the optical signals in a second dimension towards the environment; and
    receiving, by the receiver, at least a portion of the optical signals reflected from the environment.

14. The optical sensing method of claim 13, wherein, before receiving the at least a portion of the optical signals, the method further comprises:
    transmitting, by a beam splitter, the at least a portion of the optical signals towards the receiver.

15. The optical sensing method of claim 13, wherein, before receiving the at least a portion of the optical signals, the method further comprises:
    reflecting, by a portion of a MEMS mirror, the at least a portion of the optical signals towards the receiver.

16. The optical sensing method of claim 13, wherein an alignment between the optical source and the receiver remains unchanged when the 1D optical sensing architecture is caused to rotate by the rotary base.

17. The optical sensing method of claim 13, wherein the optical source comprises a single laser emitting module.

18. The optical sensing method of claim 13, wherein the optical source comprises a limited number of laser emitting modules less than a first predetermined threshold.

19. The optical sensing method of claim 13, wherein the receiver comprises a single photosensing detector.

20. The optical sensing method of claim 13, wherein the receiver comprises a number of photosensing detectors less than a second predetermined threshold.

* * * * *